(12) United States Patent
Raskind

(10) Patent No.: US 10,019,691 B2
(45) Date of Patent: Jul. 10, 2018

(54) METHODS FOR TRACKING AND ANALYZING AUTOMOTIVE PARTS TRANSACTION DATA, AND AUTOMATICALLY GENERATING AND SENDING AT A PRE-DETERMINED FREQUENCY COMPREHENSIVE REPORTS THEREOF

(71) Applicant: Jerry Raskind, Torrance, CA (US)

(72) Inventor: Jerry Raskind, Torrance, CA (US)

(73) Assignee: TOYOTA MOTOR SALES, U.S.A., INC., Plano, TX (US)

( * ) Notice: Subject to any disclaimer, the term of this patent is extended or adjusted under 35 U.S.C. 154(b) by 802 days.

(21) Appl. No.: 14/199,949

(22) Filed: Mar. 6, 2014

(65) Prior Publication Data

US 2015/0254591 A1    Sep. 10, 2015

(51) Int. Cl.
*G06Q 10/06* (2012.01)
*G06Q 30/02* (2012.01)

(52) U.S. Cl.
CPC ... *G06Q 10/06393* (2013.01); *G06Q 30/0201* (2013.01)

(58) Field of Classification Search
CPC .............. G06Q 10/06393; G06Q 30/0201
See application file for complete search history.

(56) References Cited

U.S. PATENT DOCUMENTS

| | | | | |
|---|---|---|---|---|
| 5,765,143 A | * | 6/1998 | Sheldon | G06Q 20/203 705/22 |
| 6,633,851 B1 | * | 10/2003 | Engler | G06Q 10/10 705/21 |
| 8,577,736 B2 | | 11/2013 | Swinson et al. | |
| 2005/0187834 A1 | * | 8/2005 | Painter | G06Q 10/08 705/28 |
| 2005/0256780 A1 | | 11/2005 | Eldred | |
| 2007/0094296 A1 | * | 4/2007 | Peters, III | G06Q 10/10 |
| 2008/0015954 A1 | * | 1/2008 | Huber | G06Q 10/087 705/28 |

(Continued)

FOREIGN PATENT DOCUMENTS

CA         2593271          1/2009

OTHER PUBLICATIONS

Car-Research XRM; 1 page; 2010.

(Continued)

*Primary Examiner* — Sujay Koneru
(74) *Attorney, Agent, or Firm* — Snell & Wilmer LLP

(57) ABSTRACT

Methods for tracking and analyzing transaction data relating to the sales of automotive parts, and automatically generating and sending comprehensive reports thereof at a pre-determined frequency. In particular, a processor generates a report having analyzed sales performance data and sending the report to a recipient at a pre-determined frequency. The report having sales performance data can include key sales performance metrics, performance ratings, and inactivity alerts. The processor also generates a report having business development activity data and sending the report to a recipient at a pre-determined frequency. The report having business development activity data can include a compilation of previously performed business development activities, upcoming business development activities, and prospect status.

20 Claims, 11 Drawing Sheets

(56) References Cited

U.S. PATENT DOCUMENTS

| | | | | |
|---|---|---|---|---|
| 2008/0300962 | A1 | 12/2008 | Cawton et al. | |
| 2010/0070333 | A1* | 3/2010 | Musa | G06Q 10/087 |
| | | | | 705/28 |
| 2010/0145831 | A1* | 6/2010 | Esfandiari | G06Q 10/087 |
| | | | | 705/28 |
| 2010/0191621 | A1* | 7/2010 | Hogan | G06Q 10/087 |
| | | | | 705/28 |
| 2011/0161206 | A1* | 6/2011 | Mateer | G06Q 10/087 |
| | | | | 705/28 |
| 2012/0084135 | A1* | 4/2012 | Nissan | G06Q 30/06 |
| | | | | 705/14.38 |
| 2012/0265648 | A1* | 10/2012 | Jerome | G06Q 40/00 |
| | | | | 705/26.62 |
| 2013/0009774 | A1* | 1/2013 | Sabeta | G06Q 30/016 |
| | | | | 340/540 |
| 2013/0204663 | A1* | 8/2013 | Kahlow | G06Q 30/0202 |
| | | | | 705/7.31 |
| 2015/0262432 | A1* | 9/2015 | Yturriaga-Trenor | B60C 11/246 |
| | | | | 701/29.1 |

OTHER PUBLICATIONS

Dealer Socket; 5 pages; 2013.
ADP Dealer Services; 1 page; 2013.
Dealer.com; 3 pages; 2013.
ELEAD CRM; 1 page; 2013.

\* cited by examiner

| | | | | | | | | | | Goal: $480,000 | Gross Profit: $57,754 | Return Rate: 9.1% |
|---|---|---|---|---|---|---|---|---|---|---|---|---|
| | | | | | | | | | | Sales: $319,063 | Gross Profit %: 18.1% | Orders: 1,528 |
| | Prospects | Sales Analysis | Preferences | | | | | | | | Goal 66.5% vs Month 96% | Logout |
| | | | | | | | | | | | | Prospects: 80 |
| Active ▼ | Acct# ▼ | Customer ▼ | Status ▼ | Brand ▼ | Type ▼ | Sub Type ▼ | Last Order ▼ | Contact ▼ | Address ▼ | City ▼ | State ▼ | Zip ▼ | Phone ▼ | Fax ▼ | Email |
| • | 109052 | IRF 1677 | | | Collision | | 1/6/2014 | | 1777 Main Street | Anytown | US | 12345 | (888)555-1212 | | cus |
| • | 2247 | IRF 10297 | | | Collision | | 1/21/2014 | | 10397 Main Street | Anytown | US | 12345 | (888)555-1212 | | cus |
| • | 105838 | IRF 1058 | Stage 3 | | Collision | | 1/16/2014 | | 1158 Main Street | Anytown | US | 12345 | (888)555-1212 | | cus |
| • | 39756 | IRF 10605 | | | Mechanical | | 2/15/2012 | | 10705 Main Street | Anytown | US | 12345 | (888)555-1212 | | cus |
| • | 46003 | IRF 10792 | Stage 2 | | Collision | | 12/18/2013 | | 10892 Main Street | Anytown | US | 12345 | (888)555-1212 | | cus |
| • | 53061 | IRF 11089 | | | Collision | | 12/5/2013 | | 11189 Main Street | Anytown | US | 12345 | (888)555-1212 | | cus |
| • | 56603 | IRF 11293 | | | Collision | | 1/29/2014 | | 11393 Main Street | Anytown | US | 12345 | (888)555-1212 | | cus |
| • | 58128 | IRF 11378 | | FO | Collision | | 1/29/2014 | | 11478 Main Street | Anytown | US | 12345 | (888)555-1212 | | cus |
| • | 58742 | IRF 11405 | Promo 1 | | Collision | | 1/6/2014 | | 11505 Main Street | Anytown | US | 12345 | (888)555-1212 | | cus |
| • | 60414 | IRF 11513 | | | Collision | | 1/16/2014 | | 11613 Main Street | Anytown | US | 12345 | (888)555-1212 | | cus |

| Profile | Performance | Order History | CRM Activity | | | |
|---|---|---|---|---|---|---|
| Date ▼ | Added By ▼ | Assigned To ▼ | Follow-up Type ▼ | Follow-up Date ▼ | Complete Date ▼ | Note |
| 1/31/2014 1:08 AM | Region, Portland | Account, Rep 1 | Care Package 1 | 2/3/2014 | | Follow-up with prospective client with promotional coupons for OEM collision parts. |

About | Help | ✉ | Latest Invoice: January 30, 2014     Region, Portland - Dealership 1

METHODS FOR TRACKING AND ANALYZING AUTOMOTIVE PARTS TRANSACTION DATA, AND AUTOMATICALLY GENERATING AND SENDING AT A PRE-DETERMINED FREQUENCY COMPREHENSIVE REPORTS THEREOF

BACKGROUND

1. Field

The present invention relates generally to the field of automotive dealership management systems and methods thereto, commonly known as dealership management systems, or DMS.

2. Description of the Related Art

Typically, when a vehicle repair shop needs to purchase automotive parts, it orders the parts from a local dealership of the automobile manufacturer. For example, if the repair shop is repairing a Toyota vehicle, it typically orders the automotive parts from the local Toyota dealership. The repair shop typically has a wholesale account with the local automotive dealership relating to the purchase of automotive parts. The local automotive dealership usually has a computer system tracking basic transaction, billing, and inventory information. This computer system is commonly known as a dealership management system, or DMS.

However, the current DMS technology fails to provide sophisticated analysis tools that can track and analyze transaction, billing, and inventory information to provide valuable sales performance data that an automotive dealership can use to improve its sales of automotive parts. The current DMS technology also fails to provide the analyzed sales performance data as comprehensive reports that enable a local dealership to quickly understand its sales performance and make informed business decisions accordingly. The current DMS technology also does not allow the analyzed sales performance data to be sent automatically as a report on a pre-determined frequency. The current DMS technology also fails to provide analyzed salesperson performance data that an automotive dealership can use to improve the performance of its salesperson relating to the sales of automotive parts.

The ability for a dealership to automatically receive analyzed sales performance data and salesperson performance data in a comprehensive report on a pre-determined frequency is particularly useful for managing the customer relationship between a dealership and an automotive parts-buying customer. Typically, the automotive parts-buying customer is a vehicle repair shop who orders many different vehicle parts on a regular basis. An average vehicle repair shop services many different brands of vehicles. Therefore, an average vehicle repair shop may use thousands of different automotive parts. However, an average vehicle repair shop may not have the resources to utilize sophisticated analysis tools to keep track of its order trends and inventory. Therefore, the vehicle repair shop usually orders the parts on an as-needed basis. As a result, the repair shop may lose valuable time and business waiting for the arrival of the parts when ordered on an as-needed basis.

The dealership can alleviate this problem with tracking and automatic reporting of sales performance data relating to an account. Thus, the dealership can determine the order trends of a vehicle repair shop, and suggests to the repair shop that it is due for various parts. The dealership can further provide wholesale discounts on such orders. Moreover, by selling more automotive parts in one transaction, the dealership lowers the number of deliveries, and thus, lowers the overall cost of delivery.

Moreover, given the high number of different automotive parts, there is a need to reduce the shipment of wrong vehicle parts with by tracking and automatically reporting the return rate of an account. Original Equipment Manufacturer ("OEM") refers to the manufacturer of the original automotive part. In the automotive industry, automotive parts generally fall into three categories: OEM, Original Equipment Service Parts ("OES"), and non-OEM. OEM is a replacement part made by the manufacturer of the original automotive part. OES is a replacement automotive part made by the same manufacturer or supplier of the original equipment manufacturer part but is not manufactured to the same specification as the OEM automotive part. Non-OEM can be an aftermarket automotive part, a recycled automotive part, or a remanufactured automotive part.

There is also a need for tracking and automatically reporting business development data relating to a prospective or an actual customer of automotive parts.

In light of the foregoing, there is a need for improved methods and systems for optimizing the customer relationship between an automotive parts-buying customer and a dealership by tracking and analyzing transaction data relating to the sales of automotive parts as well as business development activities corresponding to an actual or a potential customer of automotive parts, and automatically generating and sending comprehensive reports thereof at a pre-determined frequency.

SUMMARY OF THE INVENTION

The present invention addresses the foregoing needs by providing methods and systems for tracking and analyzing transaction data relating to the sales of automotive parts, and automatically generating and sending comprehensive reports thereof at a pre-determined frequency. The present invention also addresses the foregoing needs by providing methods and systems for tracking and analyzing business development activities corresponding to an actual or a potential customer of automotive parts, and automatically generating and sending comprehensive reports thereof at a pre-determined frequency.

The present invention provides a method for tracking and analyzing transaction data relating to the sales of automotive parts, and automatically generating and sending a comprehensive report thereof at a pre-determined frequency, the method comprising receiving, at a processor, from a user via a graphical user interface automotive parts transaction data including, account information including an account number, and a customer name and corresponding contact information, and purchase information corresponding to the account information, the purchase information including an automotive parts identifier, a purchase price, a purchase quantity corresponding to each automotive parts identifier, a date of the purchase, and a salesperson name procuring the purchase, receiving, at the processor, from the user via the graphical user interface sales goal information including a monthly sales goal, receiving, at the processor, from the user via the graphical user interface a request for a report having sales performance data derived from the automotive parts transaction data and from the sales goal information, and wherein the sales performance data covers a specified time period, generating, using the processor, the report, and sending automatically, using the processor, the report to a recipient at a pre-determined frequency.

The present invention provides a method for tracking and analyzing business development activities corresponding to an actual or a potential customer of automotive parts, and automatically generating and sending comprehensive reports thereof at a pre-determined frequency, the method comprising receiving, at a processor, from a user via a graphical user interface customer data including a name of a customer, actual or potential, contact information corresponding to the customer, a salesperson name procuring the customer, receiving, at the processor, business development information corresponding to the customer, the business development information including a business development activity, receiving, at the processor, a request for a report including business development activity data derived from the customer data and from the business development information, the business development activity data including an upcoming business development activity to be performed on a pre-determined date, generating, using the processor, the report, and sending automatically, using the processor, the report to a recipient at a pre-determined frequency.

BRIEF DESCRIPTION OF THE DRAWINGS

Other systems, methods, features and advantages of the present invention will be or will become apparent to one of ordinary skill in the art upon examination of the following figures and detailed description. It is intended that all such additional systems, methods, features and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 2B is a screenshot of a graphical user interface's subpage further showing certain features under the Prospects tab according to an exemplary embodiment of the present invention.

FIG. 3B is a screenshot of a graphical user interface's subpage further showing certain features under the Sales Analysis tab according to an exemplary embodiment of the present invention.

FIG. 3C is a screenshot of a graphical user interface's subpage further showing certain features under the Sales Analysis tab according to an exemplary embodiment of the present invention.

DETAILED DESCRIPTION

Figure 1:
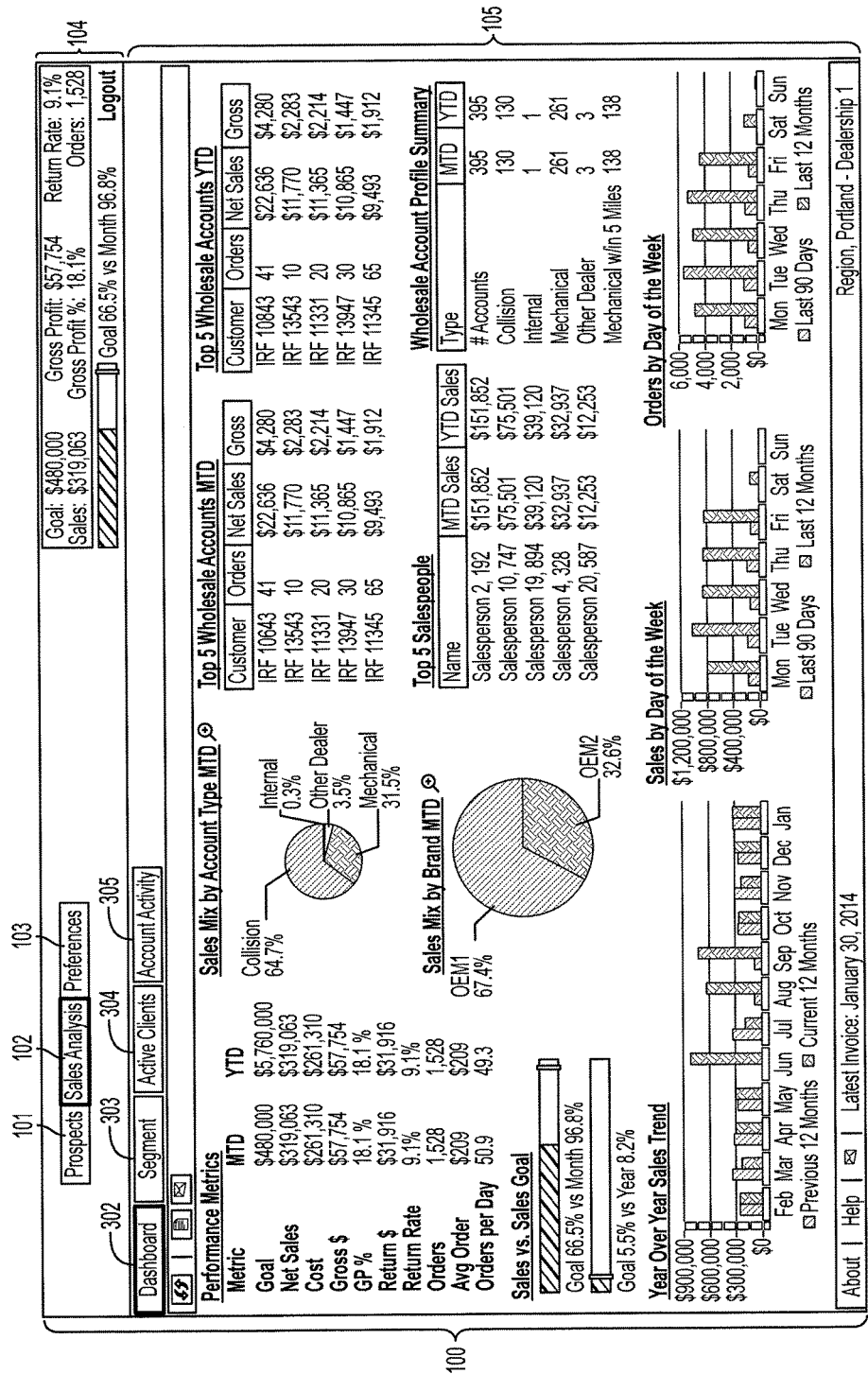
FIG. 1 is a screenshot of a graphical user interface's homepage showing analyzed transaction data relating to the sales of automotive parts according to an exemplary embodiment of the present invention.

FIG. 1 is a screenshot of a graphical user interface's homepage showing analyzed transaction data relating to the sales of automotive parts according to an exemplary embodiment of the present invention. At the upper left corner of homepage 100, there is a Prospects toolbar 101, a Sales Analysis toolbar 102, and a Preferences toolbar 103. Prospects toolbar 101 enables a user to create an account profile for a prospective customer of automotive parts, and keep track of past and future business development activities relating to a prospective customer, as discussed further below. Sales Analysis toolbar 102 enables a user to view sales and customer data, customize the screens, filter data, and generate customized reports according to the user's specific needs, as discussed further below. Preferences toolbar 103 enables a user to set-up its departmental information, create or edit users, schedule alerts, and set sales goals, as discussed further below. Under each of toolbars 101-103, there are additional tabs allowing the user to perform additional functions, as discussed further below.

As shown in FIG. 1, at the upper right corner of homepage 100, there is a Statistics Bar 104. Statistics Bar 104 shows the current month's sales performance metrics, such as goal, sales, gross profits, gross profit percentage, return rate, number of orders, and a progress bar showing the progress of the actual monthly sales as compared to the monthly sales goal. By default, the body 105 of homepage 100 is Dashboard tab 302 under Sales Analysis toolbar 102, as shown in FIG. 1. The user can change default body 105 as desired.

Figure 2A:
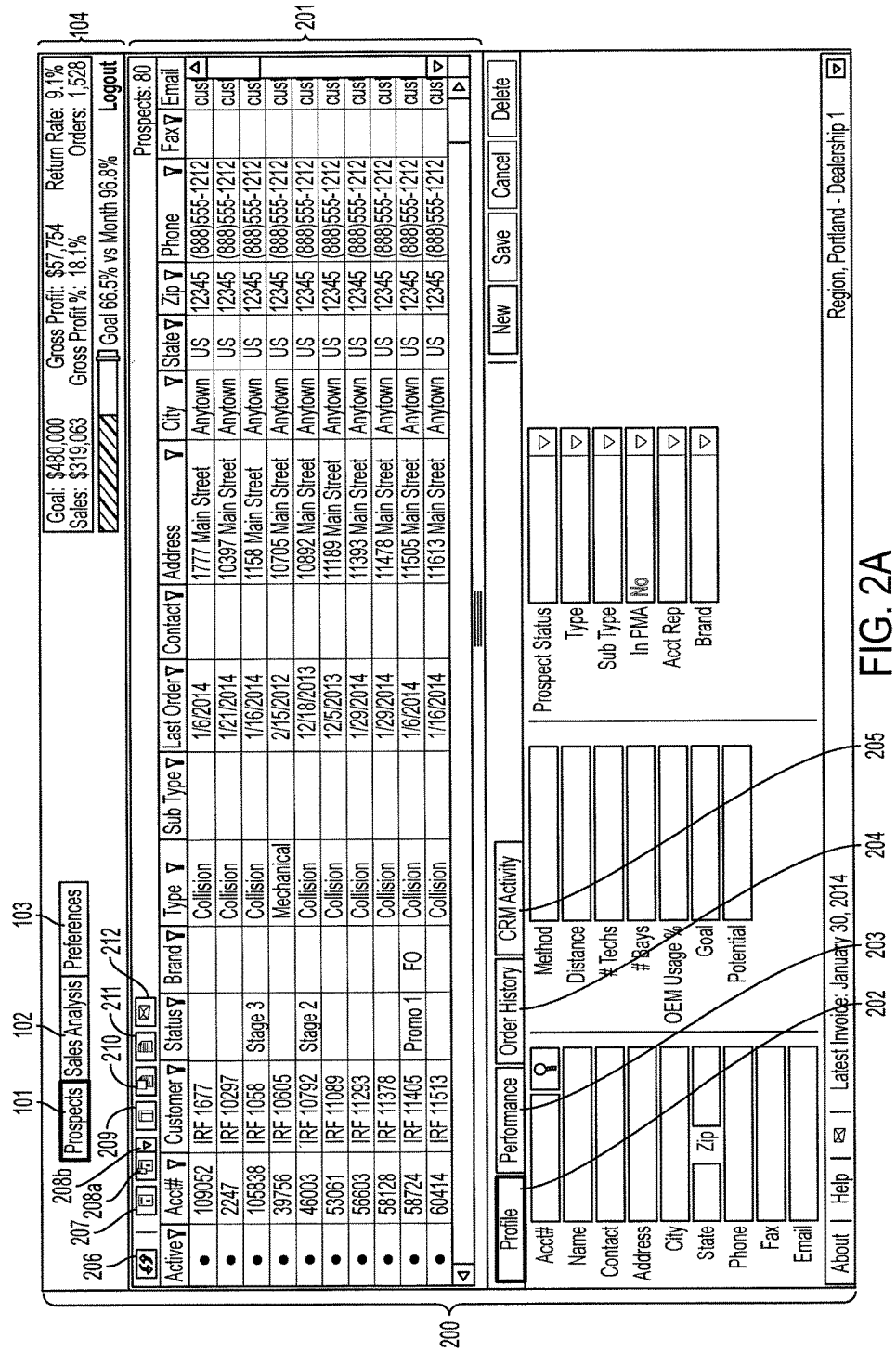
FIG. 2A is a screenshot of a graphical user interface's subpage showing certain features under the Prospects tab according to an exemplary embodiment of the present invention.

FIG. 2A is a screenshot of a graphical user interface's subpage showing certain features under Prospects tab 101 according to an exemplary embodiment of the present invention. In particular, FIG. 2A shows the selection of Profile tab 202 of Prospects webpage 200.

Prospects body 201 of Prospects webpage 200 shows a list of prospective customers of automotive parts, and corresponding account information shown in the columns. As shown by the columns in FIG. 2A, the corresponding account information of a prospective customer includes its account status, account number, name of prospective customer, prospect status, brand of vehicle, type of automotive part (i.e., collision, mechanical, internal, or other dealer), sub-type of automotive part, last order date, contact person for the prospective customer, address, city, state, zip, phone, fax, and email. The corresponding column account information of a prospective customer can further include account representative (i.e., salesperson), in PMA, delivery method, delivery distance, number of technicians, number of bays, OEM usage percentage, potential, and goal. The user can change the column layout to include these additional corresponding column account information by selecting the desired columns using down arrow 208*b* of Manage Column Layout icon 208*a*, as discussed further below.

As shown in FIG. 2A, at the lower left corner of Prospects webpage 200, there is a Profile tab 202, a Performance tab 203, an Order History tab 204, and a Customer Relations Management ("CRM") Activity tab 205. Under Profile tab 202, the user can create and update a profile account for a new prospective customer, or add an actual but dormant customer to the list of prospective customers. As shown in FIG. 2A, when creating a new prospective customer profile, the user can input an account number, name of prospective customer, contact person for the prospective customer, address, city, state, zip, phone, fax, email, delivery method, delivery distance, number of technicians, number of bays, OEM usage percentage, goal, potential, prospect status, type of automotive part, sub-type of automotive part, in PMA, account representative (i.e., salesperson), and brand of vehicle. New profile accounts can be manually added or imported in bulk.

Under Performance tab 203, the user can view the performance metrics of a selected prospective customer, such as net sales, gross profit, gross profit percentage, return amount, return rate, number of orders, last order, average amount of an order, net sales per day, number of orders per day, goal, percentage of goal, and potential. Also, under Performance tab 203, the user can view these performance metrics based on month-to-date (MTD), last 90 days, year-to-date (YTD), and rolling 12 months. Further, under Performance tab 203, there is a dropdown menu enabling the user to view charts based on gross profit percentage, gross profit, order trend, return amount, return rate, and net sales trend.

Under Order History tab 204, the user can view the order history of a selected prospective customer. Specifically, under Order History tab 204, there is a dropdown menu enabling the user to view the order history of the selected prospective customer by invoice, OEM type, or account representative (i.e., salesperson). If the user selects invoice grouping, then the user can view, for each previous invoice of the selected prospective customer, the associated account representative (i.e., salesperson) for the invoice, invoice number, date of invoice, net sales, cost, gross profit, gross profit percentage, number of parts sold, payment type, and source. If the user selects OEM type grouping, then the user can view, for each OEM type previously ordered by the selected prospective customer, the name of the OEM type, the last order, net sales, cost, gross profit, gross profit percentage, and number of parts sold. If the user selects account representative (i.e., salesperson) type, then the user can view, for each account representative (i.e., salesperson) involved with the selected prospective customer, the name of the account representative (i.e., salesperson), last order, net sales, cost, gross profit, gross profit percentage, and number of parts sold.

FIG. 2B is a screenshot of a graphical user interface's subpage further showing certain features under Prospects tab 101 according to an exemplary embodiment of the present invention. In particular, FIG. 2B shows the selection of CRM Activity tab 205 of Prospects webpage 200.

As shown in FIG. 2B, under CRM Activity tab 205, the user can manage his or her past and future business development activities relating to a selected prospective customer. Under CRM Activity tab 205, the user can create notes and edit notes relating to business development efforts untaken with a selected prospective customer. Specifically, under CRM Activity tab 205, the user can memorialize each business development activity by date, account representative (i.e., salesperson) who added the note, account representative (i.e., salesperson) assigned to execute the follow-up business development effort, follow-up type, date of follow-up, complete date, and notes. The follow-up type can take many different forms, such as an in-person visit, email, call, text, or send a care package. The care package can include promotional offers (i.e., coupons) and/or other marketing materials.

As shown in FIG. 2B, under CRM Activity tab 205, there is an Add New Note icon 213, an Add New Follow-up icon 214, an Edit Activity icon 215, a Delete Selected Activity icon 216, and a Reset Column Filters icon 216. New notes can be added by selecting Add New Note icon 213. New follow-up tasks, including specifying follow-up type and follow-up date, can be added by selecting Add New Follow-up icon 214. Each CRM activity can be edited by selecting Edit Activity icon 215. Each CRM activity can be deleted by selecting Delete Selected Activity icon 216. Column filters can be reset by selecting Reset Column Filters icon 217.

As shown in FIGS. 2A-2B, near the upper left corner of webpage 200, there is a Refresh Data icon 206, a Save Column Layout icon 207, a Manage Column Layout icon 208a having a down arrow 208b, a Reset Column Filters icon 209, a Save to CSV File icon 210, a PDF Report for Printing icon 211, and an Email PDF Report icon 212. If any changes are made to information in Prospects body 201, the screen can be updated by selecting Refresh Data icon 206. Changes to the column layout can be saved by selecting Save Column Layout icon 207. Down arrow 208b of Manage Column Layout icon 208a allows the user to select the corresponding column account information it wishes to view. By selecting down arrow 208b, the user can select from the following corresponding column account information to view on Prospects body 201: account status, account number, name of prospective customer, prospect status, brand of vehicle, type of automotive part sold (i.e., collision, mechanical, internal, or other dealer), sub-type of automotive part sold, last order date, contact person for the prospective customer, address, city, state, zip, phone, fax, email, account representative (i.e., salesperson), in PMA, delivery method, delivery distance, number of technicians, number of bays, OEM usage percentage, potential, and goal. The data provided in Prospects body 201 can be viewed again by selecting Reset Column Filters icon 209. The data provided in Prospects body 201 can be saved as a Microsoft Excel file by selecting Save to CSV File icon 210. The data provided in Prospects body 201 can be created as a PDF for printing by selecting PDF Report for Printing icon 211. The data provided in Prospects body 201 can be emailed as a PDF by selecting Email PDF Report icon 212.

Figure 3A:
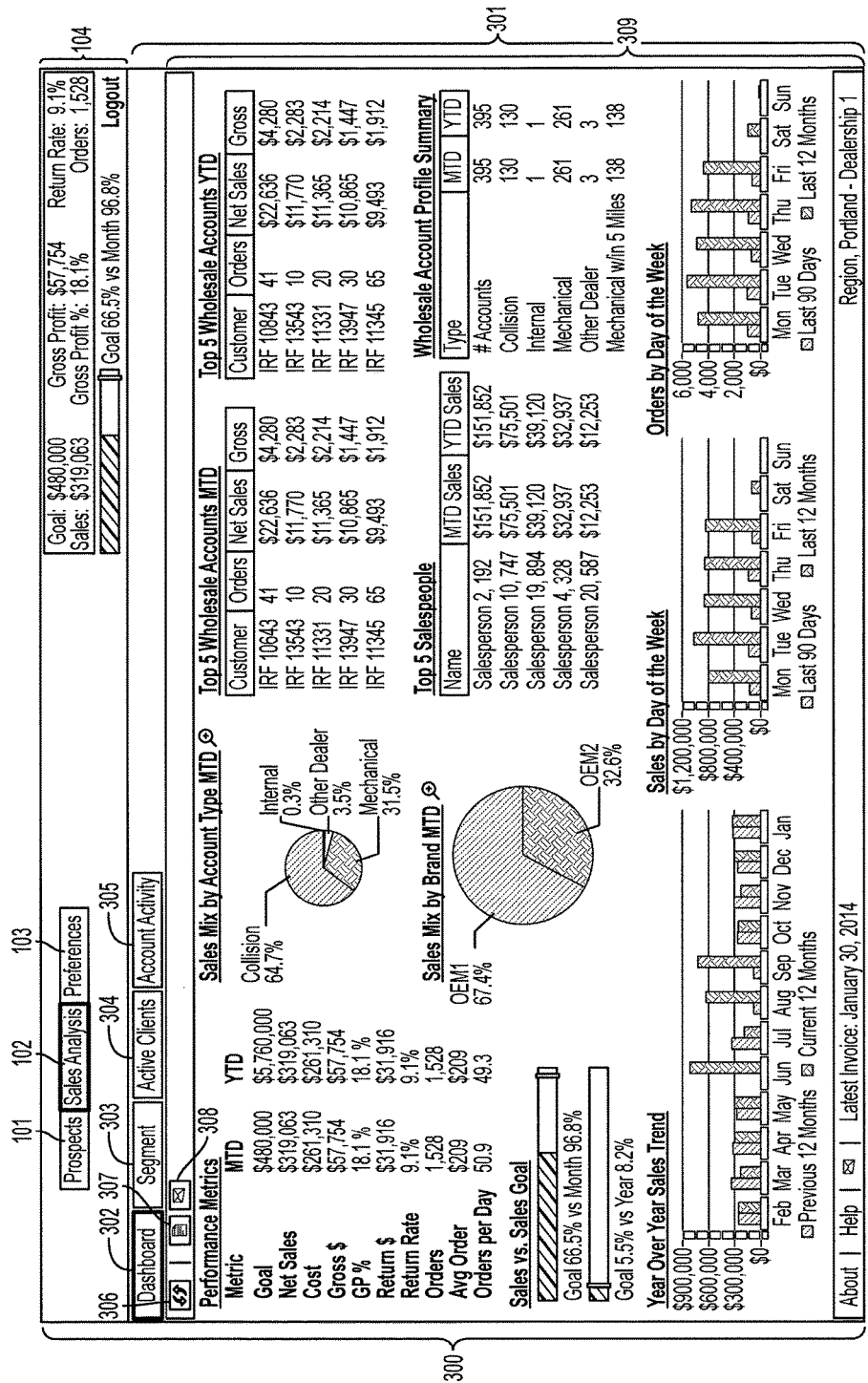
FIG. 3A is a screenshot of a graphical user interface's subpage showing certain features under the Sales Analysis tab according to an exemplary embodiment of the present invention.

FIG. 3A is a screenshot of a graphical user interface's subpage showing certain features under Sales Analysis tab 102 according to an exemplary embodiment of the present invention. In particular, FIG. 3A shows the selection of Dashboard tab 302 of Sales Analysis webpage 300.

As shown in FIG. 3A, under Sales Analysis toolbar 702, there a Dashboard tab 302, a Segment tab 303, an Active Clients tab 304, and an Account Activity tab 305. Under Dashboard tab 302, Sales Report body 301 provides a sales performance report 309 relating to the sales of automotive parts. Sales performance report 309 is generated from automotive parts' invoice data. Sales performance report 309 provides performance metrics, actual sales versus sales goal, sales mix by account type month-to-date (MTD), sales mix by brand MTD, top 5 customer accounts MTD, top 5 customer accounts year-to-date (YTD), top 5 account representatives (i.e., salespersons), customer account profile summary, year over year sales trend, sales by day of the week, and order by day of the week. As shown in FIG. 3A, the performance metrics include, for each of MTD and YTD, goal, net sales, gross profit, gross profit percentage, return amount, return rate, number of orders, average order price, and orders per day.

As shown in FIG. 3A, under Dashboard tab 302, there is a Refresh Data icon 306, a PDF Report for Printing icon 307, and an Email PDF Report icon 308. If any changes are made to sales performance report 309, the screen can be updated by selecting Refresh Data icon 307. Sales performance report 309 can be created as a PDF for printing by selecting PDF Report for Printing icon 307. Sales performance report 309 can be emailed as a PDF by selecting Email PDF Report icon 308.

Segment tab 303 allows the user to sort sales activity data based on different criteria. Sales activity data can be segmented by timeframe and/or by different segment types, such as by account representative (i.e., salesperson), OEM, payment type, shipment method, delivery distance (i.e., determined by zip code), type of automotive part (i.e., collision, mechanical, internal, or other dealer).

Figure 3B:
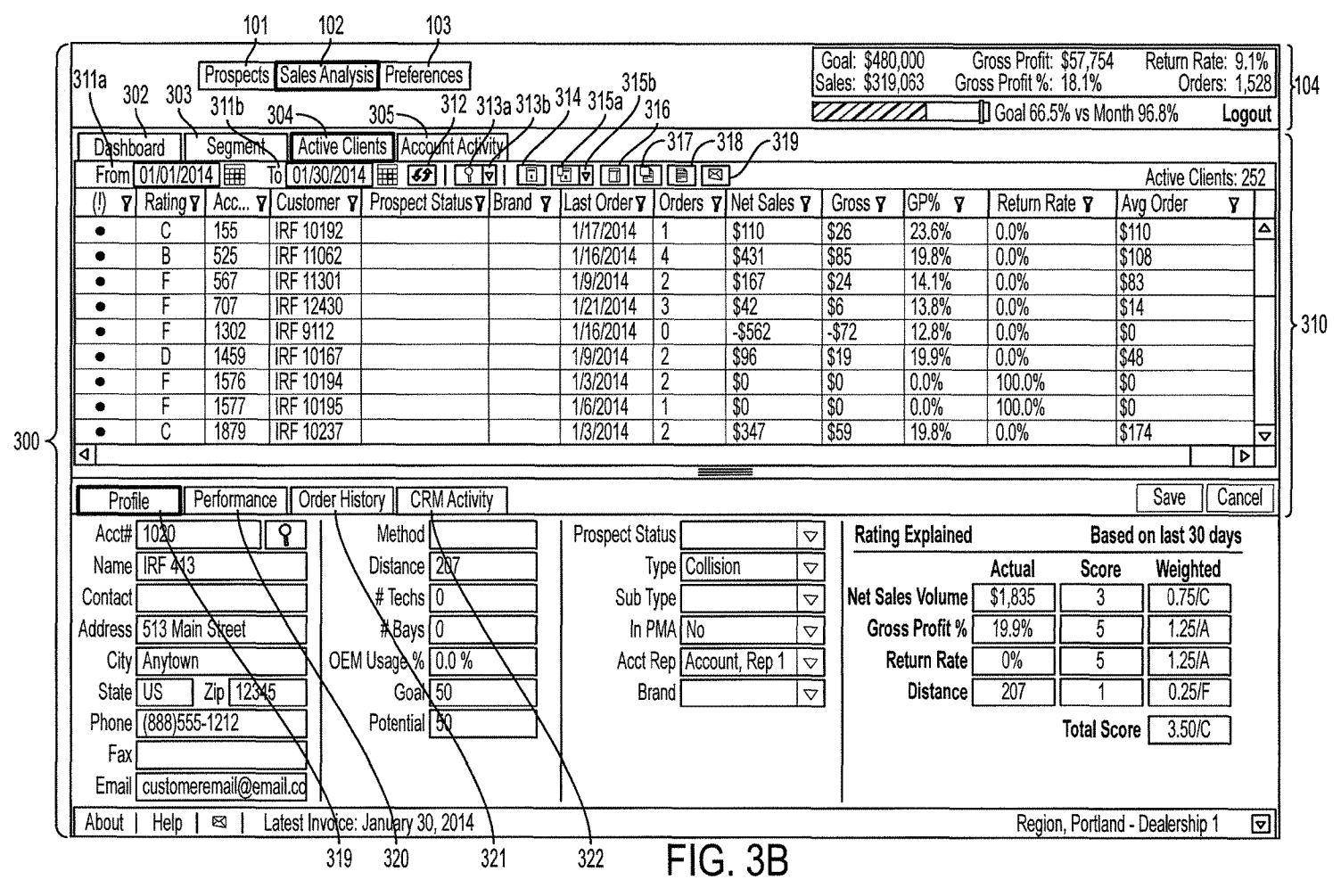

FIG. 3B is a screenshot of a graphical user interface's subpage further showing certain features under Sales Analysis tab 102 according to an exemplary embodiment of the present invention. In particular, FIG. 3B shows the selection of Active Clients tab 304 of Sales Analysis webpage 300.

As shown in FIG. 3B, under Active Clients tab 304, there is an Active Clients body 310 listing all active customers and corresponding column account information. Active Clients tab 304 includes filtering and sorting tools to allow the user to filter and sort the data, as discussed further below. As shown in FIG. 3B, Active Clients body 310 shows, for each active customer, its current status (shown as "(!)" column), rating, account number, customer name, prospectus status, brand, last order date, number of orders, net sales, gross profit, gross profit percentage, return rate, and average order price. The dot under current status (shown as "(!)" column) informs the user that the active customer has not purchased in a specified number of days. Although not shown in FIG. 3B, the corresponding column account information of an active customer can also include net sales rating, gross profit rating, return rating, distance rating, account representative (i.e., salesperson), in PMA, prospect, type of automotive part sold, sub-type of automotive part sold, delivery method, delivery distance, number of technicians, number of bays, OEM usage percentage, potential, goal, cost, sug, quantity, return amount, net sales per day, orders per day, goal met, contact, address, city, state, zip, phone, fax, and email. The user can change the column layout to include these additional corresponding column account information by selecting the desired columns using down arrow 315b of Manage Column Layout icon 315a, as discussed further below.

As shown in FIG. 3B, under Active Clients tab 304, there is a start date icon 311a, an end date icon 311b, a Refresh Data icon 312, a Search for Active Clients icon 313a having a down arrow 313b, a Save Column Layout icon 314, a Manage Column Layout icon 315a having a down arrow 315b, a Reset Columns Filter icon 316, a Save to CSV File icon 317, a PDF Report for Printing icon 318, and an Email PDF Report icon 319. The user can sort the active customer data according to a desired timeframe by selecting the desired start date and the desired end date using icons 311a and 311b, respectively. If any changes are made to information in Active Clients body 310, the screen can be updated by selecting Refresh Data icon 312. Down arrow 313b of Search for Active Clients icon 313a allows the user to search for active customers by account number or customer name. Changes to the column layout can be saved by selecting Save Column Layout icon 314. Down arrow 315b of Manage Column Layout icon 315a allows the user to select the corresponding column account information it wishes to view. By selecting down arrow 315b, the user can select from the following corresponding column account information to view on Active Clients body 310: current status (shown as "(!)" column), rating, account number, customer name, prospectus status, brand, last order date, number of orders, net sales, gross profit, gross profit percentage, return rate, average order price, net sales rating, gross profit rating, return rating, distance rating, account representative (i.e., salesperson), in PMA, prospect, type of automotive part sold, sub-type of automotive part sold, delivery method, delivery distance, number of technicians, number of bays, OEM usage percentage, potential, goal, cost, sug, quantity, return amount, net sales per day, orders per day, goal met, contact, address, city, state, zip, phone, fax, and email. The data provided in Active Clients body 310 can be viewed again by selecting Reset Column Filters icon 316. The data provided in Active Clients body 310 can be saved as a Microsoft Excel file by selecting Save to CSV File icon 317. The data provided in Active Clients body 310 can be created as a PDF for printing by selecting PDF Report for Printing icon 318. The data provided in Active Clients body 310 can be emailed as a PDF by selecting Email PDF Report icon 318.

As shown in FIG. 3B, under Active Clients tab 304, there is also a Profile tab 319, Performance tab 320, Order History tab 321, and CRM Activity tab 322. Active Clients tab 304 provides features similar to those discussed for Active Clients tab 202 of FIGS. 2A-2B, except that (a) for Active Clients tab 304, the prospective customer of Active Clients tab 202 is now an active customer, and (b) unlike Active Clients 202, Active Clients tab 304 provides a Rating Score (i.e., A, B, C, D, F) based on factors such as net sales volume, gross profit percentage, return rate, and delivery distance, as shown on FIG. 3B. Similarly, but for the change from a prospective customer to an active customer, Profile tab 319 provides features similar to those discussed for Profile tab 203 of FIGS. 2A-2B, Order History tab 321 provides features similar to those discussed for Order History tab 204 of FIGS. 2A-2B, and CRM Activity tab 322 provides features similar to those discussed for CRM Activity tab 205 of FIGS. 2A-2B.

Figure 3C:
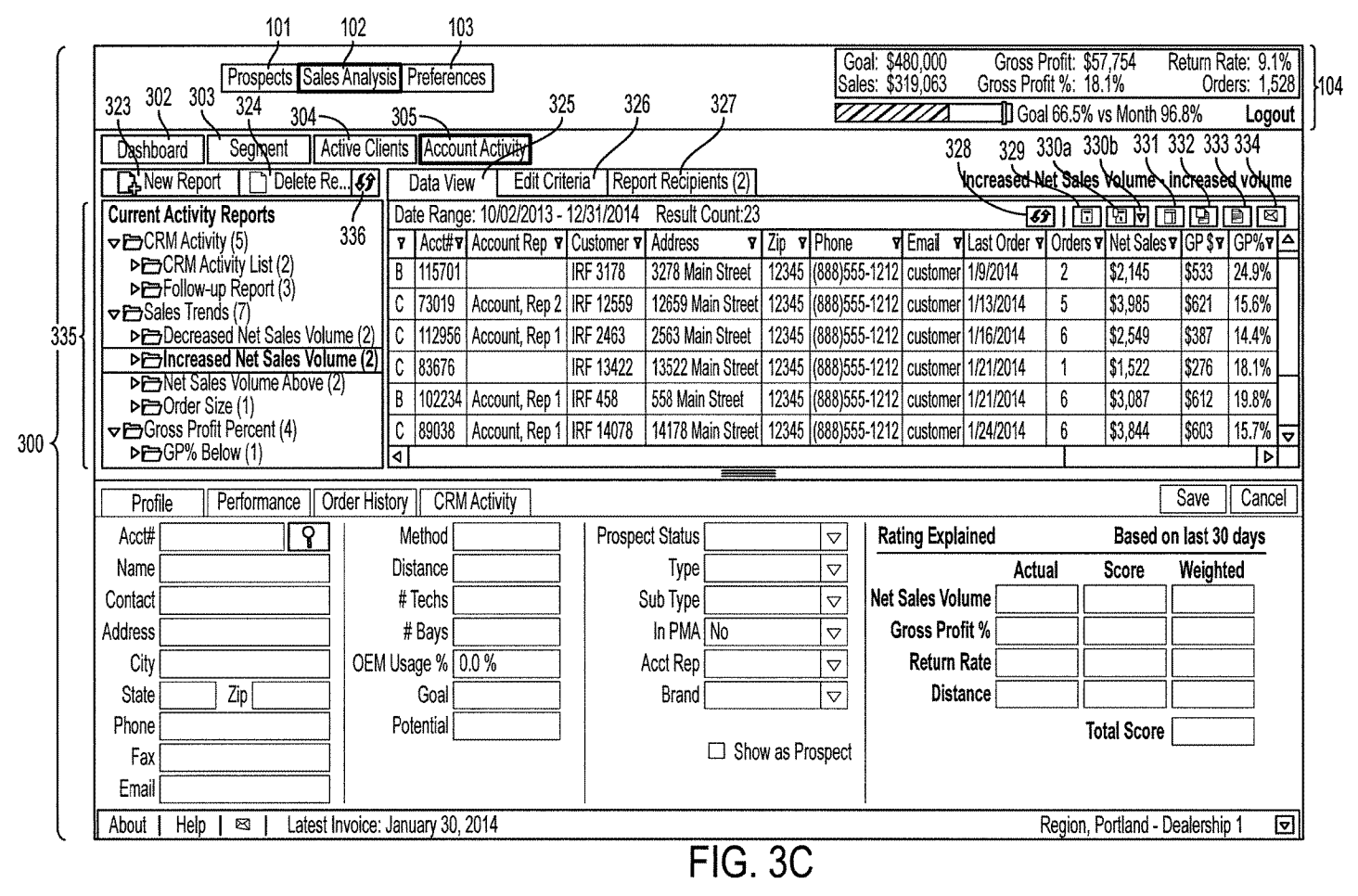

FIG. 3C is a screenshot of a graphical user interface's subpage further showing certain features under Sales Analysis tab 102 according to an exemplary embodiment of the present invention. In particular, FIG. 3C shows the selection of Account Activity tab 305 of Sales Analysis webpage 300.

As shown in FIG. 3C, under Account Activity tab 305, the user can create, view, and edit different sales performance reports relating to the sales of automotive parts. Under Account Activity tab 305, there is an Add New Activity Report icon 323, a Delete Activity Report icon 324, a Refresh icon 326, and a window 335 showing the different types of sales performance reports that the user can create, view or delete. These different types of sales performance reports, as shown on FIG. 3C, are only exemplary reports. These exemplary reports are shown and discussed further below because they are particularly useful and informative to the local dealerships. Thus, the present invention provides these built-in exemplary sales performance reports. However, the user can create and customize different sales performance reports that suit its needs using the tools provided under Account Activity tab 305, as discussed further below. Moreover, the user can schedule the sales performance reports to be sent at a specific time and at a specific frequency. For example, the user can configure the sales performance reports to be sent via email on a daily, weekly, or monthly basis.

As shown in window 335 of FIG. 3C, the present invention provides certain built-in exemplary sales performance reports. Under the CRM Activity folder, there is a CRM Activity List Report and a Follow-up Report. The CRM Activity List Report shows all account contacts made in a given period of time, and is based on the 'CRM Activity' tab on each account. The Follow-up Report shows all follow-up activities that need to be performed in a specified time frame, and can be filtered according to the account sales representative.

Under the Sales Trend folder, there is a Decreased Sales Volume Report, an Increased Sales Volume Report, a Net Sales Volume Above Report, a Net Sales Volume Below Report, and an Order Size Report. The Increased Sales Volume Report and the Decreased Sales Volume Report show which accounts' sales volume is trending up or down, respectively. The Net Sales Volume Above Report and the Net Sales Volume Below Report show which accounts exceed or fall below a specified number of orders. The Order Size Report shows all the specific orders that have exceeded a specific amount.

Under the Gross Profit Percent folder, there is a Gross Profit Percentage (GP %) Above Report, a GP % Below Report, an Individual Invoice GP % Report, and an Individual Parts GP % Report. The GP % Above Report and the GP % Below Report show which accounts exceed or fall below, respectively, a specified gross profit percentage. The Individual Invoice GP % Report shows all invoices below a specified gross profit percentage. The Individual Parts GP % Report shows all individual automotive parts sold below a specified gross profit percentage.

Under the Order Trends folder, there is an Increased Order Volume Report, a Decreased Order Volume, a Last Order Date Report, a New Activity Report, an Order Volume Above Report, and an Order Volume Below Report. The Increased Order Volume Report and the Decreased Order Volume Report show which accounts' order volume is trending up or down, respectively. The Last Order Date Report shows which accounts have not placed an order for a prolonged period of time. The New Activity Report shows which accounts are brand new or which accounts have been revived. The Order Volume Above Report and the Order Volume Below Report shows which accounts exceed or fall below a specified number of orders.

Under the Returns folder, there is a Return $ Above Report, a Return $ Below Report, a Return Rate Above Report, and a Return Rate Below Report. The Return $ Above Report and the Return $ Below Report show which accounts have returned above, or below, respectively, a specified amount. The Return Rate Above Report and the Return Rate Below Report show which accounts exceed or flow below, respectively, a specified return rate.

Although not shown in FIG. 3B, the present invention also provides built-in exemplary sales performance reports for a Total Department Report, a Salesperson Report, a Customer Report, and an Active Clients Report.

The Total Department Report provides a summary of key performance metrics of all transactions, and custom date ranges can be created. Such key performance metrics include sales, cost, gross profit, gross profit percentage, return dollars, return rate, orders per day, sales per day, and sales per order.

The Salesperson Report provides a summary of key performance metrics of all transactions groups according to the respective account sales representative, and custom date ranges can be created. Such key performance metrics include sales, cost, gross profit, gross profit percentage, return dollars, return rate, orders per day, sales per day, and sales per order.

The Customer Report provides a summary of key performance metrics of a specific account. Such key performance metrics include sales, cost, gross profit, gross profit percentage, return dollars, return rate, orders per day, sales per day, and sales per order.

The Active Clients Report provides a summary of all accounts based on the combination of the key performance metrics chosen by the user, and data filters applied to such metrics. The user can chose from key performance metrics, such as sales, cost, gross profit, gross profit percentage, return dollars, return rate, orders per day, sales per day, and sales per order.

As further shown in FIG. 3C, under Account Activity tab 305, there is a Data view tab 325, an Edit Criteria tab 326, and a Report Recipients tab 327. Data View tab 325 allows the user to view the corresponding column account information associated with a selected sales performance report. For example, as shown in FIG. 3C, for the selected Increased Net Sales Volume report, Data View tab 325 shows a corresponding column account information of rating, account number, account representative (i.e., salesperson), customer name, address, zip, phone, email, last order date, number of orders, net sales, gross profit, and gross profit percentage. Additionally, by selecting down arrow 330b, the user can select from the following corresponding column account information to view under Account Activity tab 305: current status (shown as "(!)" column), rating, account number, customer name, prospectus status, brand, last order date, number of orders, net sales, gross profit, gross profit percentage, return rate, average order price, net sales rating, gross profit rating, return rating, distance rating, account representative (i.e., salesperson), in PMA, prospect, type of automotive part sold, sub-type of automotive part sold, delivery method, delivery distance, number of technicians, number of bays, OEM usage percentage, potential, goal, cost, sug, quantity, return amount, net sales per day, orders per day, goal met, contact, address, city, state, zip, phone, fax, and email.

Edit Criteria tab 326 allows the user to edit various criteria associated with a selected sales performance report. The various criteria are customizable depending on the needs of the user. By way of example, for the selected Increased Net Sales Volume report, the user can edit the data associated with various criteria, such as account type (i.e., all, collision, internal, mechanical, other dealer), account representative, accounts that have increased net sales volume by 25% in the last 25 week days as compared to the previous 63 week days order volume, and only show accounts where net sales are at least $1,500 in same period.

Report Recipients tab 327 allows the user to send a selected sales performance report to one or more recipients at a pre-determined frequency for each recipient. The pre-determined frequency can be daily, monthly, day-specific (i.e., Monday, Tuesday, Wednesday, Thursday, Friday, Saturday, and Sunday), or any other specified timing. The pre-determined frequency can be varied as needed.

As further shown in FIG. 3C, under Data View tab 325, there is a Refresh Data icon 328, a Save Column Layout icon 329, a Manage Column Layout icon 330a having a down arrow 330b, a Save to CSV File icon 331, a PDF Report for Printing icon 332, an Email PDF Report icon 333, and a Reset Column Filters 334. If any changes are made to information shown under Data View tab 325, the screen can be updated by selecting Refresh Data icon 328. Changes to the column layout can be saved by selecting Save Column Layout icon 329. Down arrow 330b of Manage Column Layout icon 330a allows the user to select the corresponding column account information it wishes to view. The data provided in Data View tab 325 can be saved as a Microsoft Excel file by selecting Save to CSV File icon 331. The data provided in Data View tab 325 can be created as a PDF for printing by selecting PDF Report for Printing icon 332. The data provided in Data View tab 325 can be emailed as a PDF by selecting Email PDF Report icon 333. The data provided in Data View tab 325 can be viewed again by selecting Reset Column Filters icon 334.

Figure 4A:
FIG. 4A is a screenshot of a graphical user interface's subpage showing certain features under the Preferences tab according to an exemplary embodiment of the present invention.
Figure 4B:
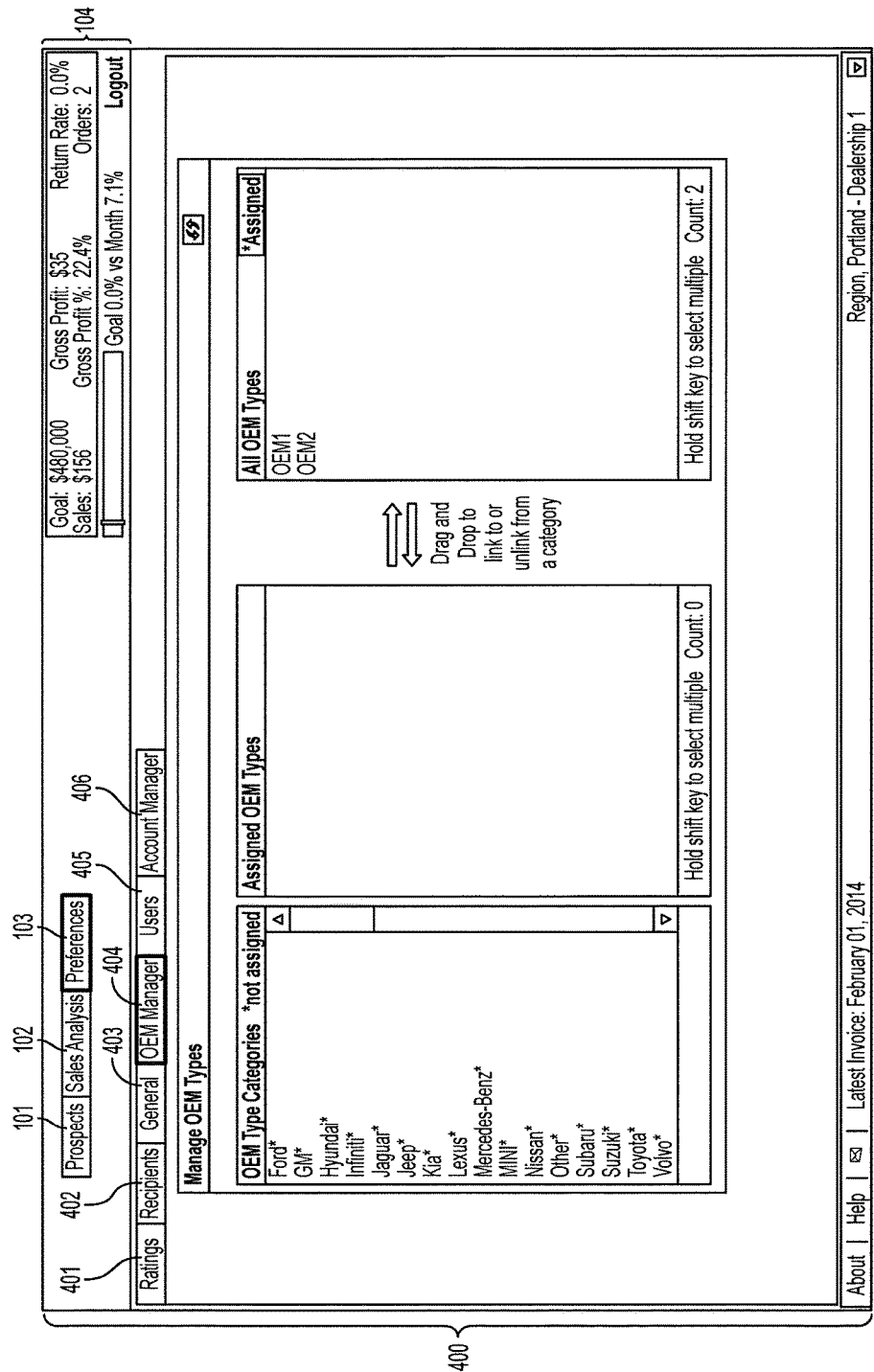
FIG. 4B is a screenshot of a graphical user interface's subpage further showing certain features under the Preferences tab according to an exemplary embodiment of the present invention.

FIG. 4A is a screenshot of a graphical user interface's subpage showing certain features under Preferences tab 103 according to an exemplary embodiment of the present invention. In particular, FIG. 4A shows the selection of Ratings tab 401 of Preferences webpage 400. FIG. 4B is a screenshot of a graphical user interface's subpage further showing certain features under Preferences tab 103 according to an exemplary embodiment of the present invention. In particular, FIG. 4B shows the selection of OEM Manager tab 404 of Preferences webpage 400.

As shown in FIGS. 4A-4B, under Preferences toolbar 103, there is a Ratings tab 401, a Recipients tab 402, a General tab 403, an OEM Manager tab 404, a Users tab 405, and an Account Manager tab 406. Under Ratings tab 401, the user can create a customized rating system for each account type based on the criteria of sales volume, gross profit percentage, return rate, and/or delivery distance. As shown in FIG. 4A, for each criteria, the user can input and modify its desired weight and its desired value for each of ratings A, B, C, D, or F. The weight column should add up to 100%. A rating of A is considered the best (i.e., exceeding expectations), a rating of B is considered above average, a rating of C is considered average, a rating of D is considered below average, and a rating of F is considered the worst (i.e., not meeting expectations). Additionally, Lockback Time Frame dropdown menu 407 allows the user to specify the time period in which it wishes to apply the ratings to. For example, the user can specify a lock-back time frame of the previous 30 days, 60 days, 90 days, or 120 days. Manage Account Type Ratings dropdown menu 408 allows the user to select different account types (i.e., collision, mechanical, internal, or other dealer). Default Rating checkbox 409 allows the user to set a default rating for each account type. Enabled checkboxes 410a, 410b, 410c, and 410d allow the user to select or deselect the corresponding ratings criteria. Recalculate Ratings button 411 allows the user to calculate the ratings based on any new or modified ratings inputs. The calculated and recalculated ratings are shown under Active Clients body 310 of Sales Analysis tab 102, as shown in FIG. 3B.

Under Recipients tab 402, the user can add, edit, or delete recipients of sales performance reports. The recipients can be added, edited, or deleted individually or by group.

Under General tab 403, the user can manage the general settings. First, the user can add, edit, or delete account representatives (i.e., salesperson). Second, the user can schedule alerts to provide an alert when an account has not ordered in a specified number of days. The alert is provided under the current status (shown as "(!)") column in Active Clients body 310 of Sales Analysis tab 102, as shown in FIG. 3B. Third, the user can add, edit, or delete CRM follow-up types, such as a telephone call, a text, an email, an in-person visit, different care packages, and others. Fourth, the user can command the system to automatically set active customers to inactive customers. Fifth, the user can set a monthly sales goal. The monthly sales goal will then be shown in Statistics Bar 104. Sixth, the user can add, edit, or delete Prospect Status types, such as on-hold, promotion 1, promotion 2, stage 1, stage 2, stage 3, and others. Finally, the user can add, edit, or delete Prospect Brand types, such as different vehicle brands.

As shown in FIG. 4B, under OEM Manager tab 404, the user can manage different OEM types. OEM refers to the manufacturer of the original automotive part. In the automotive industry, automotive parts generally fall into three categories: OEM, OES, and non-OEM. OEM is a replacement part made by the manufacturer of the original automotive part. OES is a replacement automotive part made by the same manufacturer or supplier of the original equipment manufacturer part but is not manufactured to the same specification as the OEM automotive part. Non-OEM can be an aftermarket automotive part, a recycled automotive part, or a remanufactured automotive part. As shown in FIG. 4B, the OEM Type Categories is the brand name of the vehicle (i.e., Toyota), the Assigned OEM Types are the OEM types assigned to a particular OEM Type Category. For example, Toyota may have different types of OEM parts and thus, the user can customize the Assigned OEM Types to reflect these different types of OEM parts.

Under Users tab 404, the user can add, edit, or delete users, and assign the access level for each user. The access level can be administrative, user, or viewer. Under Account Manager tab 405, the user can remove accounts, hide accounts on sales performance reports, and view all active accounts in a specified time period.

Figure 5:
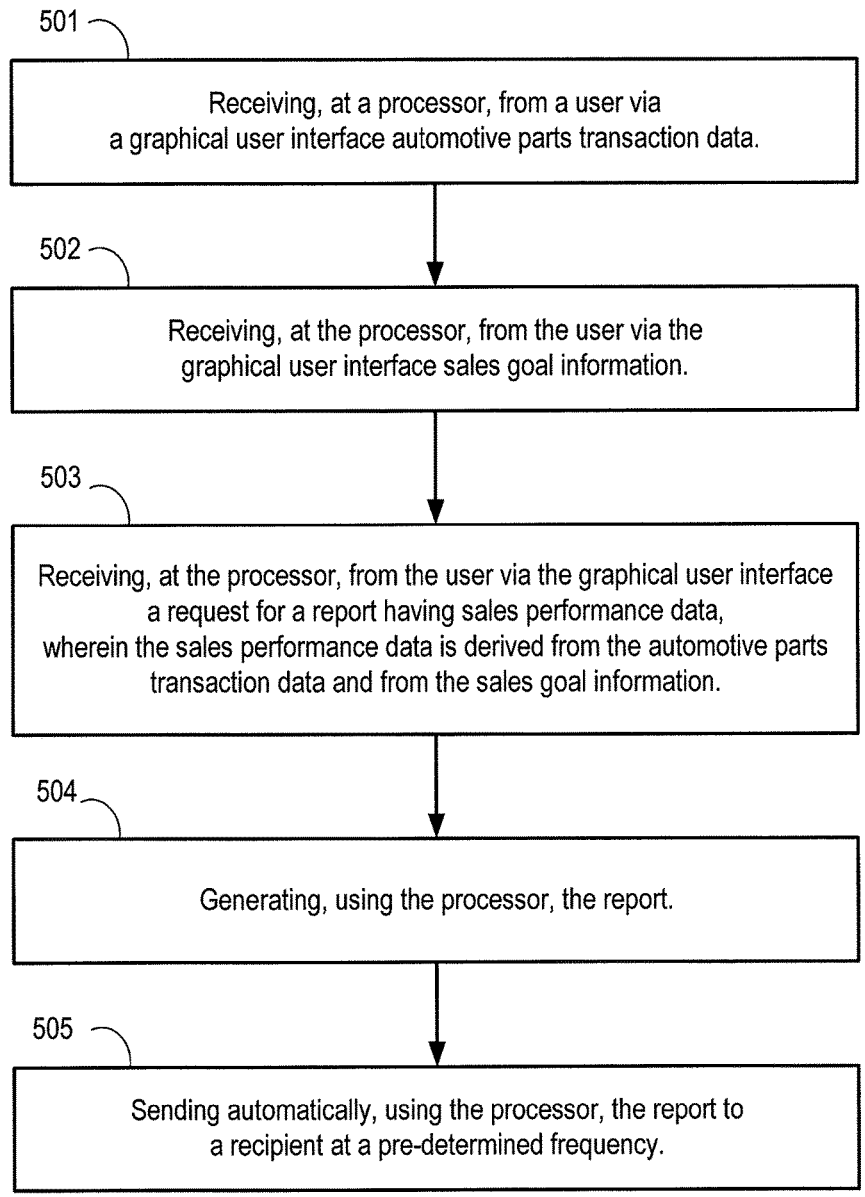
FIG. 5 is a flow chart of a method for tracking and automatically reporting sales performance data relating to the sales of automotive parts according to an exemplary embodiment of the present invention.

FIG. 5 is a flow chart of a method for tracking and automatically reporting sales performance data relating to the sales of automotive parts according to an exemplary embodiment of the present invention.

Figure 7:
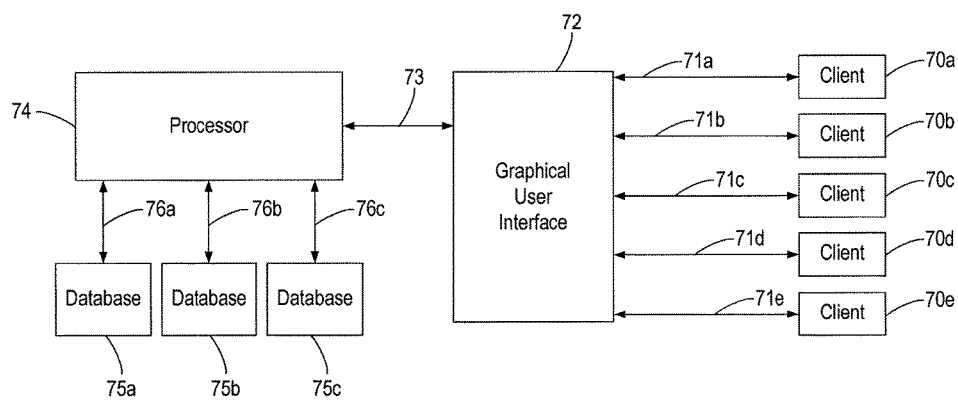
FIG. 7 is a client-server system architecture corresponding to methods according to an exemplary embodiment of the present invention.

At step 501, a processor, such as processor 74 of FIG. 7, receives automotive parts transaction data, which is transaction data relating to the sales of automotive parts. The processor receives the automotive parts transaction data from a user, such as client 70a of FIG. 7, via a graphical user interface, such as graphical user interface 72 of FIG. 7. The graphical user interface can be a web-based graphical user interface, a tablet-based application or "App," a mobile-based application or "App," a software computer program, or any other suitable graphical user interface known to one skilled in the art. For example, a web-based graphical user interface can be a website, as shown in FIGS. 1-4. The processor can be a computer server having the appropriate capacity to perform the functions provided by the graphical user interface. Furthermore, as shown in FIG. 7, the processor can be connected to a plurality of databases, such as databases 75a-75c. The processor can provide the graphical user interface via the Internet, a wired network, or a wireless network.

Still at step 501, the automotive parts transaction data include account information, purchase information corresponding to the account information, and, if any, return information corresponding to the account information. The account information includes an account number, a customer name and corresponding contact information. For example, as shown in FIGS. 2A, 2B, and 3C, the account information includes an account number, a customer name, a contact person for the customer, an address, a city, a zip, a phone number, a fax number, an email, number of technicians employed by the customer, and number of bays at the customer's vehicle shop. The purchase information corresponding to the account information includes an automotive parts identifier, a purchase price, a purchase quantity corresponding to each automotive parts identifier, a date of the purchase, and a salesperson name procuring the purchase. For example, as shown in FIGS. 2A, 2B, and 3C, the purchase information includes an automobile brand, type(s) of automotive part(s) sold, sub-type(s) of automobile part(s) sold, a purchase price, a purchase quantity, a date and a time of order, a delivery distance, a delivery method, and an account representative (i.e. salesperson). The type of automotive parts can be an automotive collision part, an automotive mechanical part, or an automotive internal part. The return information includes a returned automotive parts identifiers, a return price, a return quantity corresponding to each automotive parts identifier, and a date of the return.

At step 502, the processor receives sales goal information, including a monthly sales goal. For example, as described in the discussion of General tab 403 of FIGS. 4A-4B, the user can set a monthly sales goal under General tab 403. The processor receives the sales goal information from the user via the graphical user interface.

At step 503, the processor receives a request for a report having sales performance data derived from the automotive parts transaction data and from the sales goal information. The processor receives the request from the user via the graphical user interface. A plurality of different reports can be made available to the user, such as a Decreased Sales Volume Report, an Increased Sales Volume Report, a Net Sales Volume Above Report, a Net Sales Volume Below Report, an Order Size Report, a Gross Profit Percentage (GP %) Above Report, a GP % Below Report, an Individual Invoice GP % Report, an Individual Parts GP % Report, an Increased Order Volume Report, a Decreased Order Volume, a Last Order Date Report, a New Activity Report, an Order Volume Above Report, an Order Volume Below Report, a Return $ Above Report, a Return $ Below Report, a Return Rate Above Report, a Return Rate Below Report, a Total Department Report, a Salesperson Report, a Customer Report, and an Active Clients Report, all of which were discussed in FIG. 3C. The sales performance data associated with each of the aforementioned reports were discussed in FIG. 3C. The processor receives the request for one of these reports. Alternatively, the processor can receive a request for a customized report having only certain sales performance data in which the user is interested in. Moreover, the report can be limited to sales performance data relating to a specified time period. For example, the specified time period can be month-to-date (MTD), year-to-date (YTD), or any other timeframe desired by the user.

At step 504, the processor generates the report. The report has the sales performance data derived from the automotive parts transaction data and from the sales goal information. The processor generates the report having sales performance data by calculating and analyzing the automotive parts transaction data and the sales goal information to arrive at the particular sales performance data. The requested report comprises one or more sales performance data according to the type of report requested, as discussed in FIG. 3C. Alternatively, the requested report can be a customized to include only certain sales performance data in which the user is interested in.

The sales performance data can be a MTD gross profit amount, a YTD gross profit amount, a MTD gross profit percentage, a YTD gross profit percentage, a MTD total orders, a YTD total orders, a MTD average order amount, a YTD average order amount, a MTD average number of orders per day, a YTD average number of orders per day, a comparison of MTD actual sales versus monthly sales goal, a comparison of YTD actual sales versus yearly sales goal, a comparison of MTD actual sales based on the different types of automotive parts, a comparison of YTD actual sales based on the different types of automotive parts, a sales trend, an orders trend, a chart showing top performing MTD account representatives based on MTD total sales, a chart showing top performing YTD account representatives based on YTD total sales, a chart showing top performing MTD customers based on MTD gross profit amount, a chart showing top performing YTD customers based on YTD gross profit amount, an alert corresponding to each account number if the corresponding account number has not placed an order in a pre-determined period of time, a MTD return amount, a YTD return amount, a MTD return rate, and a YTD return rate.

For example, as shown in FIGS. 2A-2B, and 3A-3C, the sales performance data includes net sales, gross profit, gross profit percentage, last order date, total number of orders, overall rating, net sales rating, gross profit rating, return rating, distance rating, alerts for inactivity, potential, cost, return amount, return rate, net sales per day, orders per day, goal met. The sales performance data are also compiled and presented in charts and graphs, as shown under Dashboard tab 309 of FIG. 3A.

The sales performance data can further include a sales performance rating corresponding to an account number, wherein the sales performance rating is calculated from a weighted average of at least one of the following criteria: (a) a total number of sales over a pre-determined period of time corresponding to the account number, (b) a gross profit percentage over the pre-determined period of time corresponding to the account number, (c) a return rate over the pre-determined period of time corresponding to the account number, and (d) an average delivery distance over the pre-determined period of time corresponding to the account number. Thus, the report can provide an overall rating, a total sales rating, a net sales rating, a gross profit rating, a return rating, and/or a distance rating.

An exemplary embodiment of this rating system is described in FIG. 4A. As described, under Ratings tab 401, the user can create a customized rating system for each account type based on the criteria of sales volume, gross profit percentage, return rate, and/or delivery distance. As shown in FIG. 4A, for each criteria, the user can input and modify its desired weight and its desired value for each of ratings A, B, C, D, or F. The weight column should add up to 100%. A rating of A is considered the best (i.e., exceeding expectations), a rating of B is considered above average, a rating of C is considered average, a rating of D is considered below average, and a rating of F is considered the worst (i.e., not meeting expectations). Additionally, Lockback Time Frame dropdown menu 407 allows the user to specify the time period to which it wishes to apply the ratings. For example, the user can specify a lock-back time frame of the previous 30 days, 60 days, 90 days, or 120 days. Manage Account Type Ratings dropdown menu 408 allows the user to select different account types (i.e., collision, mechanical, internal, or other dealer). Default Rating checkbox 409 allows the user to set a default rating for each account type. Enabled checkboxes 410a, 410b, 410c, and 410d allow the user to select or deselect the corresponding ratings criteria. Recalculate Ratings button 411 allows the user to calculate the ratings based on any new or modified ratings inputs. The calculated and recalculated ratings are shown under Active Clients body 310 of Sales Analysis tab 102 of FIG. 3B.

At step 505, the processor automatically sends the report to a recipient at a pre-determined frequency. The pre-determined frequency can be daily, monthly, by day of the week (i.e. every Monday), or any other timing that the user wishes. The pre-determined frequency can be varied as needed. The recipient can be any person or company that the user wishes to send the report to, including the user himself or herself. For example, the processor can automatically send the report to a manager of a local automotive dealership daily via email.

Figure 6:
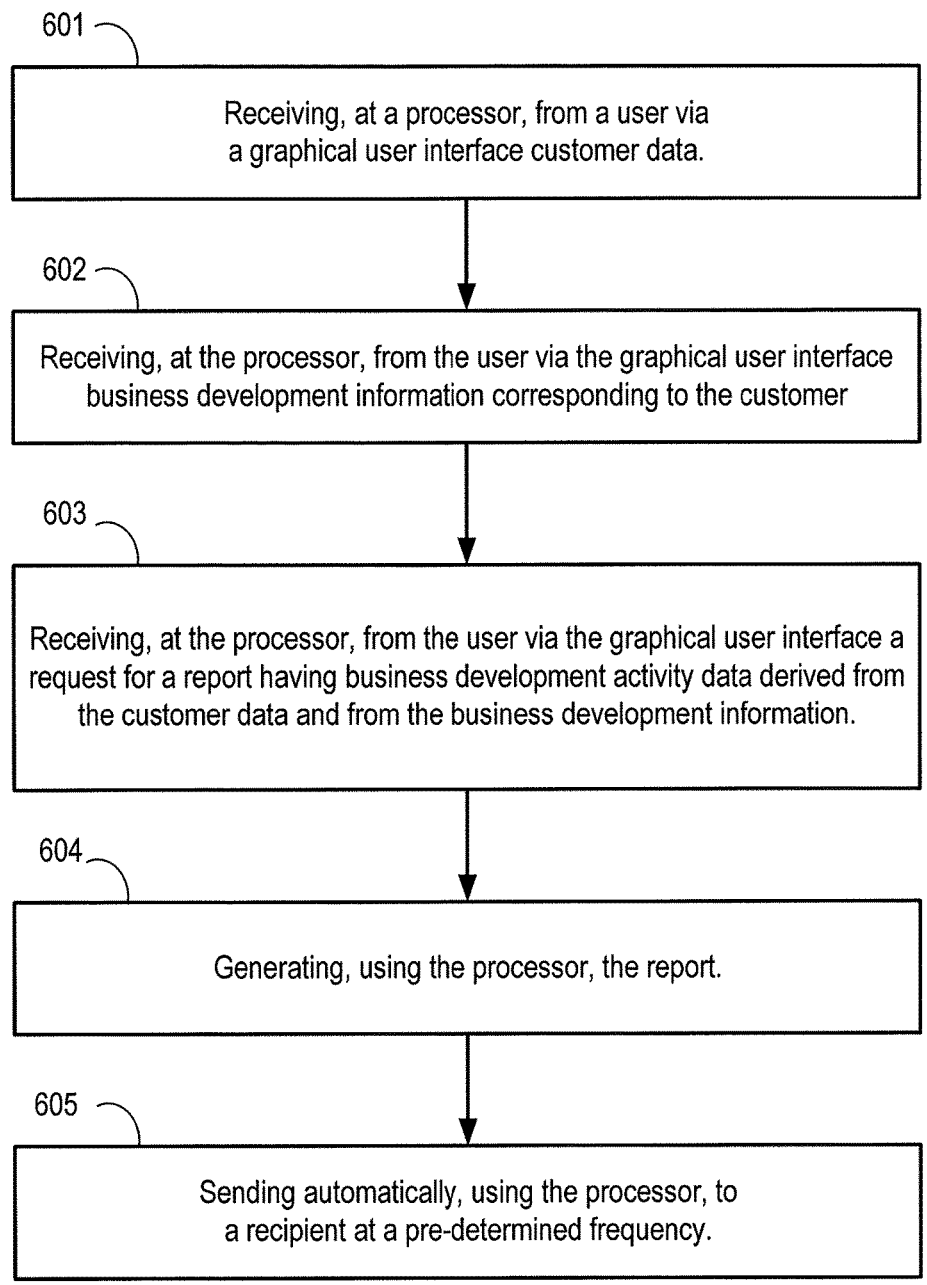
FIG. 6 is a flow chart of a method for tracking and automatically reporting business development activities corresponding to an actual or a prospective customer of automotive parts according to an exemplary embodiment of the present invention.

FIG. 6 is a flow chart of a method for tracking and automatically reporting business development activities corresponding to an actual or a prospective customer of automotive parts according to an exemplary embodiment of the present invention.

At step 601, a processor, such as processor 74 of FIG. 7, receives customer data, which is an actual or a prospective customer data relating to the sales of automotive parts. The processor receives the customer data from a user, such as client 70*a* of FIG. 7, via a graphical user interface, such as graphical user interface 72 of FIG. 7. The graphical user interface can be a web-based graphical user interface, a tablet-based application or "App," a mobile-based application or "App," a software computer program, or any other suitable graphical user interface known to one skilled in the art. For example, a web-based graphical user interface can be a website, as shown in FIGS. 1-4. The processor can be a computer server having the appropriate capacity to perform the functions provided by the graphical user interface. Furthermore, as shown in FIG. 7, the processor can be connected to a plurality of databases, such as databases 75*a*-75*c*. The processor can provide the graphical user interface via the Internet, a wired network, or a wireless network.

Still at step 601, the customer data includes a name of an actual or a prospective customer of automotive parts, contact information corresponding to the customer, and a salesperson name procuring the customer. For example, as shown in FIG. 2A, the customer data can include an account number, a customer name, a contact person for the customer, an address, a city, a zip, a phone number, a fax number, an email, number of technicians, number of bays, an account representative (i.e., salesperson) procuring the customer.

Additionally, at step 601, the customer data can include previously performed business development activity information, if any. The previously performed business development activity information includes a previously performed business development activity, a date of the previously performed business development activity, and a salesperson name who previously performed the business development activity. The previously performed business development activity can be an in-person visit, a follow-up phone call, a follow-up email, a follow-up text message, sending via mail a promotional marketing material, sending via email a promotional marketing material, sending via text message a promotional marketing material, or any other activity designed to elicit business. As discussed, the promotional marketing material can be a coupon, a freebie, or any other form of discount or promotion. The customer data can further include a note relating to the customer. The note can be any type of information relating to the customer. For example, as shown in FIG. 2B, the note can be, "Follow-up with prospective customer with promotional coupons for OEM collision parts."

At step 602, the processor receives business development information corresponding to the customer. The processor receives the business development information from the user via the graphical user interface. The business development information includes a business development activity. The business development activity can be an in-person visit, a follow-up phone call, a follow-up email, a follow-up text message, sending via mail a promotional marketing material, sending via email a promotional marketing material, sending via text message a promotional marketing material, or any other activity designed to elicit business.

At step 603, the processor receives a request for a report having business development activity data derived from the customer data and from the business development information. The processor receives the request from the user via the graphical user interface. A plurality of different reports can be made available to the user, such as a CRM Activity List Report and a Follow-up Report, which were discussed in FIG. 3C. The CRM Activity List Report shows all account contacts made in a given period of time for each account. The Follow-up Report shows all follow-up activities that need to be performed in a specified time frame, and can be filtered according to the account representative. The processor receives the request for one of these reports. Alternatively, the processor can receive a request for a customized report having only certain business development activity data in which the user is interested in. Moreover, the report can be limited to sales performance data relating to a specified time period.

Still at step 603, the business development activity data includes an upcoming business development activity to be performed on a pre-determined date. The pre-determined date can be any date. The business activity data can include the prospect status, a future business development activity and the pre-determined date thereof, a date of last contact and contact method thereof, and, if applicable, any previously performed business development activity, date thereof, and corresponding account representative thereof. The prospect status can be on-hold, promotion 1, promotion 2, stage 1, stage 2, stage 3, or any other applicable status.

At step 604, the processor generates the report. The report has the business development activity data derived from the customer data and from the business development information. The processor generates the report having business development activity data by calculating and analyzing the customer data and the business development information. The requested report comprises one or more business development activity data according to the type of report requested, as discussed in step 602. Alternatively, the requested report can be a customized to include only certain business development activity data in which the user is interested in.

At step 605, the processor automatically sends the report to a recipient at a pre-determined frequency. The pre-determined frequency can be daily, monthly, by day of the week (i.e., every Monday), or any other timing that the user wishes. The pre-determined frequency can be varied as needed. The recipient can be any person or company to whom user wishes to send the report, including the user himself or herself. For example, the processor can automatically send the report daily to a manager of a local automotive dealership via email.

FIG. 7 is a client-server system architecture for use with the present invention's methods, according to an exemplary embodiment of the present invention. As discussed, the client-server system architecture of FIG. 7 can be used with the methods of FIGS. 6-7.

Clients 70*a*-70*e* are the users. The user can be a local automotive dealership, or any other person or entity engaged in the sales of automotive parts. As shown in FIG. 7, clients 70a-70e each communicates with processor 74 through a graphical user interface 72 by way of data transfer over suitable communication networks 73 and 71a-71e, respectively. At any time, processor 74 can communicate with a single client, such as client 70a, or a plurality of clients, such as clients 70a-70e.

In one embodiment, client 70a is a computer having a display. Any discussion of client 70a is equally applicable to each of clients 70b-70e. Each of clients 70a-70e can take many different forms, including but not limited to, a desktop computer, a laptop computer, a tablet computer, a cellular smart phone having a display, or any computer with a suitable operating system. A suitable operating system can take many different forms, including but not limited to Microsoft Windows, Apple/Mac Operating System, Google Android, iPhone Operating System, iPad Operating System, or any operating system capable of providing a graphical user interface.

In one embodiment, suitable communication network 71a can be the Internet. Any discussion of suitable communication network 71a is equally applicable to each of suitable communication networks 71b-71e, 73, and 76a-76c. In another embodiment, suitable communication network 71a can be a wireless cellular network. Each of suitable communication networks 71a-71e, 73, and 76a-76c may take many different forms, including but not limited to the Internet, wireless cellular network, local area network (LAN), wide area network (WAN), wired telephone network, wireless network, or any other network that supports data communication between the respective entities.

Processor 74 provides graphical user interface 72 to clients 70a-70e by way of data transfer over suitable communication networks 73 and 71a-71e, respectively. In one embodiment, graphical user interface 72 comprises a web-based graphical user interface, such as a website. In another embodiment, graphical user interface 72 comprises a tablet-based graphical user interface, such as an "App." Graphical user interface 72 can take many forms, including but not limited to a web-based graphical user interface such as a website, tablet-based graphical user interface such as an "App," cellular smart phone-based graphical user interface such as an "App," computer program, or any other suitable graphical user interface.

In one embodiment, processor 74 is a computer configured with the appropriate processing, memory and storage capacity to handle the load of servicing a plurality of clients 70a-70e. Processor 74 can take many different forms, including but not limited to a web server, file server, database server, proxy server, FTP server, and any other server configured with the appropriate processing, memory and storage capacity to handle the load of servicing a plurality of clients. As an example, more than one master server may be needed to provide additional processing, memory and storage capacity to handle the load of servicing a plurality of clients 70a-70e.

Processor 74 communicates with a database 75a by way of data transfer over a suitable communication network 76a. Any discussion of database 75a is equally applicable to each of databases 75b-75c. Any discussion of communication network 76a is equally applicable to each of communication networks 76b-76c. Processor 74 has the capability to communicate with a single database, such as database 75a, or with a plurality of databases, such as databases 75a-75c. Processor 74 can communicate with databases 75a-75c by way of data transfer over suitable communication networks 76a-76c, respectively. In one embodiment, suitable communication network 76a comprises a local area network (LAN). Suitable communication networks 76a-76c may take many different forms, including but not limited to the Internet, wireless cellular network, local area network (LAN), wide area network (WAN), wired telephone network, wireless network, or any other network that supports data communication between the respective entities. Alternatively, database 75a may reside within processor 74, thereby relinquishing the need for suitable communication network 76a.

Databases 75a-75c store information used by processor 74 to generate the reports, such as the report having sales performance data, or the report having business development activity data. The information can be stored in a single database, such as database 75a, or in a plurality of databases, such as databases 75a-75c. The information stored in databases 75a-75c may be continually updated as necessary. Information stored in databases 75a-75c include the automotive parts transaction data, such as the account information, the purchase information, and the return information, the sales goal information, such as the monthly sales goal, the sales performance data, the customer data, the business development information, and the business development activity data. Processor 74 analyzes and processes the information stored in databases 75a-75c to generate the reports.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for generating and sending a report having sales performance data relating to automotive parts and customers, the method comprising:

providing, by a processor, to a plurality of client devices, a graphical user interface that is unique to the generating and sending of the report, and configured to facilitate receiving and distributing information associated with a vehicle dealership;

receiving, at the processor, via the graphical user interface and the plurality of client devices, automotive parts transaction data, the plurality of client devices configured to provide the automotive parts transaction data to the processor in a distributed, computationally efficient manner;

storing, by the processor, the received automotive parts transaction data from the plurality of client devices on a plurality of databases, the plurality of databases configured to operate and distribute computing responsibilities based on a computational load demanded from the plurality of client devices and the processor;

receiving, at the processor, from a user via the graphical user interface and a client device from the plurality of client devices, a request for a report having sales performance data based on the automotive parts transaction data, the sales performance data corresponding to a specified timeframe and including a sales performance rating corresponding to an account number and indicating a value or a reliability of a customer associated with the account number;

displaying, by the graphical user interface on the client device, a sales performance rating table having a list of criteria as a first variable, a plurality of ratings as a second variable, and rating thresholds corresponding to each rating for each criteria populating the sales performance rating table, the list of criteria including (a) a total number of sales over the pre-determined timeframe corresponding to the account number, (b) a gross profit percentage over the pre-determined timeframe corresponding to the account number, (c) a return rate over the pre-determined timeframe corresponding to the account number, and (d) an average delivery distance over the pre-determined timeframe corresponding to the account number;

displaying, by the graphical user interface on the client device, a selection box corresponding with each criteria of the list of criteria, the selection box being a dynamically activatable or deactivatable computer-interpretable indicator for signaling to the processor whether a corresponding criteria is incorporated into the determination of the sales performance rating;

receiving, from the user via the graphical user interface via a computer-detected touchscreen selection input or a computer-interfacing input-device selection input from the client device, a selection of at least two criteria to be considered in the sales performance rating by user selection of corresponding selection boxes of the at least two criteria;

receiving, from the user via the graphical user interface via a computer-detected touchscreen value input or a computer-interfacing input-device value input from the client device, a weight for each of the identified at least two criteria;

automatically determining, using the processor, the sales performance rating based on the weight for each of the identified at least two criteria, the automotive parts transaction data, and the rating thresholds of the sales performance rating table;

automatically generating, using the processor, the report including the sales performance rating by outputting the report into a computer-renderable digital document, the report providing a limited representation of the automotive parts transaction data for efficient communication of the value or reliability of the customer; and automatically informing a manager of the vehicle dealership of the value or the reliability of the customer by sending, using the processor, the report to the manager of the vehicle dealership at a dynamically variable frequency via an electronic messaging system.

2. The method of claim 1, wherein the sales performance data includes a month-to-date (MTD) gross profit amount, a year-to-date (YTD) gross profit amount, a MTD gross profit percentage, a YTD gross profit percentage, a MTD total orders, a YTD total orders, a MTD average order amount, a YTD average order amount, a MTD average number of orders per day, and a YTD average number of orders per day.

3. The method of claim 1, wherein the sales performance data includes a comparison of MTD actual sales versus monthly sales goal, a comparison of YTD actual sales versus yearly sales goal, a comparison of MTD actual sales based on a plurality of automotive parts, a comparison of YTD actual sales based on the plurality of automotive parts, a sales trend, and an orders trend.

4. The method of claim 1, wherein the sales performance data includes a chart showing at least five top MTD account representatives based on each account representative's MTD total sales, a chart showing at least five top YTD account representatives based on each account representative's YTD total sales, a chart showing at least five top MTD customers based on each customer's MTD gross profit amount, and a chart showing at least five top YTD customers based on each customer's YTD gross profit amount.

5. The method of claim 1, wherein the sales performance data includes an alert corresponding to at least one account number, wherein the alert indicates that the corresponding account number has not placed at least one order in a specified period of time.

6. The method of claim 1, wherein at the step of receiving the automotive parts transaction data, the automotive parts transaction data further including return information corresponding to the account information, the return information including a returned automotive parts identifier, a return price, a return quantity corresponding to each returned automotive parts identifier, and a date of the return.

7. The method of claim 6, wherein the sales performance data further includes a MTD return amount, a YTD return amount, a MTD return rate, and a YTD return rate.

8. The method of claim 1, wherein the report is customizable to include only certain sales performance data requested by the user.

9. The method of claim 1, wherein at the electronic messaging system is email.

10. The method of claim 1, wherein the automotive parts transaction data includes account information including an account number, a customer name, and contact information, and purchase information corresponding to the account information, the purchase information including an automotive parts identifier, a purchase price, a purchase quantity corresponding to each automotive parts identifier, a date of the purchase, and a salesperson name associated with the purchase.

11. A system for generating and sending a report having sales performance data relating to automotive parts, the system comprising:

a client device configured to:
  display a graphical user interface to a user, the graphical user interface being unique to the generating and sending of the report and configured to facilitate receiving and distributing information associated with a vehicle dealership,
  receive, from the user via the graphical user interface, automotive parts transaction data,
  receive, from the user via the graphical user interface, a request for a report having sales performance data based on the automotive parts transaction data, corresponding to a specified timeframe, and including a sales performance rating corresponding to an account number indicating a value or a reliability of a customer associated with the account number,
  display a sales performance rating table having a list of criteria as a first variable, a plurality of ratings as a second variable, and rating thresholds corresponding to each rating for each criteria populating the sales performance rating table, the list of criteria including (a) a total number of sales over the pre-determined timeframe corresponding to the account number, (b) a gross profit percentage over the pre-determined timeframe corresponding to the account number, (c) a return rate over the pre-determined timeframe corresponding to the account number, and (d) an average delivery distance over the pre-determined timeframe corresponding to the account number,
  display a selection box corresponding with each criteria of the list of criteria, the selection box being a dynamically activatable or deactivatable computer-interpretable indicator for signaling to the processor whether a corresponding criteria is incorporated into the determination of the sales performance rating, receive, from the user via a computer-detected touch-screen selection input or a computer-interfacing input-device selection input, a selection of at least two criteria to be considered in the sales performance rating by user selection of corresponding selection boxes of the at least two criteria, and receive, from the user via a computer-detected touch-screen selection input or a computer-interfacing input-device selection input, a weight for each of the identified at least two criteria;

a server communicatively coupled to the client device and configured to:

receive, from the client device, the automotive parts transaction data and the request for the report, automatically determine the sales performance rating based on the weight for each of the identified at least two criteria, the automotive parts transaction data, and the rating thresholds of the sales performance rating table, automatically generate the report including the sales performance rating by outputting the report into a computer-renderable digital document, the report providing a limited representation of the automotive parts transaction data for efficient communication of the value or reliability of the customer, and automatically informing a manager of the vehicle dealership of the value or the reliability of the customer by sending the report to the manager of the vehicle dealership at a dynamically variable frequency via an electronic messaging system.

12. The system of claim 11, wherein the sales performance data includes a month-to-date (MTD) gross profit amount, a year-to-date (YTD) gross profit amount, a MTD gross profit percentage, a YTD gross profit percentage, a MTD total orders, a YTD total orders, a MTD average order amount, a YTD average order amount, a MTD average number of orders per day, and a YTD average number of orders per day.

13. The system of claim 11, wherein the sales performance data includes a comparison of MTD actual sales versus monthly sales goal, a comparison of YTD actual sales versus yearly sales goal, a comparison of MTD actual sales based on a plurality of automotive parts, a comparison of YTD actual sales based on the plurality of automotive parts, a sales trend, and an orders trend.

14. The system of claim 11, wherein the sales performance data includes a chart showing at least five top MTD account representatives based on each account representative's MTD total sales, a chart showing at least five top YTD account representatives based on each account representative's YTD total sales, a chart showing at least five top MTD customers based on each customer's MTD gross profit amount, and a chart showing at least five top YTD customers based on each customer's YTD gross profit amount.

15. The system of claim 11, wherein the sales performance data includes an alert corresponding to at least one account number, wherein the alert indicates that the corresponding account number has not placed at least one order in a specified period of time.

16. The system of claim 11, wherein the automotive parts transaction data further includes return information corresponding to the account information, the return information including a returned automotive parts identifier, a return price, a return quantity corresponding to each returned automotive parts identifier, and a date of the return.

17. The system of claim 16, wherein the sales performance data further includes a MTD return amount, a YTD return amount, a MTD return rate, and a YTD return rate.

18. The system of claim 11, wherein the report is customizable to include only certain sales performance data requested by the user.

19. The system of claim 11, wherein the electronic messaging system is email.

20. The system of claim 11, wherein the automotive parts transaction data includes account information including an account number, a customer name, and contact information, and purchase information corresponding to the account information, the purchase information including an automotive parts identifier, a purchase price, a purchase quantity corresponding to each automotive parts identifier, a date of the purchase, and a salesperson name associated with the purchase.

* * * * *